US008628151B1

(12) United States Patent
Allen et al.

(10) Patent No.: US 8,628,151 B1
(45) Date of Patent: Jan. 14, 2014

(54) SYSTEMS AND METHODS FOR FACILITATING FINANCIAL TRANSACTIONS INVOLVING BUNDLES OF PROPERTIES (75) Inventors: Susan Harper Allen, Irvine, CA (US); Frank McKenna, La Jolla, CA (US); Jacqueline Marie Doty, Olney, MD (US)

(73) Assignee: Corelogic Solutions, LLC, Santa Ana, CA (US)

( * ) Notice: Subject to any disclaimer, the term of this patent is extended or adjusted under 35 U.S.C. 154(b) by 228 days.

(21) Appl. No.: 13/031,148

(22) Filed: Feb. 18, 2011

(51) Int. Cl.
*G06Q 40/00* (2012.01)
(52) U.S. Cl.
USPC .............................................. 305/40; 305/36
(58) Field of Classification Search
USPC ..................................................... 305/35–45
See application file for complete search history.

*Primary Examiner* — Robert R Niquette
*Assistant Examiner* — Chia Yi Liu
(74) *Attorney, Agent, or Firm* — Knobbe Martens Olson & Bear LLP (57) ABSTRACT

A system is disclosed for identifying potential short sale transactions that can be bundled or combined to produce a beneficial result to the financial institutions involved. Embodiments are directed to the identification of properties matching certain criteria that make them likely candidates for a short sale transaction. Other embodiments disclosed herein assess the value of identified properties and associated mortgages to facilitate short sale transactions, so that mortgage holders can have an accurate assessment of potential losses involved in short sale and foreclosure situations where multiple mortgages are involved. One embodiment provides an assessment of estimated potential losses realized by secondary mortgage holders and/or losses avoided by primary mortgage holders in proposed short sale situations. The assessment enables financial institutions involved in certain short sales to offset losses realized and/or avoided with those financial institutions that may have opposite mortgage positions (primary vs. secondary) on other properties.

34 Claims, 7 Drawing Sheets

| |
|---|
| Property 1's Value: $250k |
| Short Sale Offer: $245k |
| 1st Mortgage: Bank A, $275k |
| Borrower Delinquency Status: 120 Days Delinquent |
| 2nd Mortgage: Bank B, $45k |
| Borrower Delinquency Status: Current |
| Expected Value Post Foreclosure: $215k |
| Carrying Cost: $10k |

| |
|---|
| Property 2's Value: $175k |
| Short Sale Offer: $145k |
| 1st Mortgage: Bank A, $190k |
| Borrower Delinquency Status: 180 Days Delinquent |
| 2nd Mortgage: Bank B, $35k |
| Borrower Delinquency Status: 60 Days Delinquent |
| Expected Value Post Foreclosure: $115k |
| Carrying Cost: $7.5k |

BUNDLE 1 - 1st Mortgage Holder = BANK A

Losses Avoided = Short Sale Offer - (Expected Value Post Foreclosure*Time Value Discount Factor) + Carrying Costs Potential Losses Avoided by A:

Property 1: $245k - ($215k*0.98) + $10k = $44.3k

Property 2: $145k - ($115k*0.98) + $7.5k = $39.8k

Aggregate: $44.3k + $39.8k = $84.1k

Losses Realized = Mortgage Amount Held by Junior Mortgage Holder

Potential Losses Realized by B:

Property 1's Mortgage Balance + Property 2's Mortgage Balance $45k + $35k = $80k

FIG. 4A

| Property 3's Value: $370k |
| Short Sale Offer: $365k |
| 1st Mortgage: Bank B, $375k |
| Borrower Delinquency Status: 210 Days Delinquent |
| 2nd Mortgage: Bank A, $25k |
| Borrower Delinquency Status: Current |
| Expected Value Post Foreclosure: $345k |
| Carrying Cost: $8k |

| Property 4's Value: $675k |
| Short Sale Offer: $590k |
| 1st Mortgage: Bank B, $790k |
| Borrower Delinquency Status: 120 Days Delinquent |
| 2nd Mortgage: Bank A, $55k |
| Borrower Delinquency Status: 30 Days Delinquent |
| Expected Value Post Foreclosure: $460k |
| Carrying Cost: $16k |

BUNDLE 2 - 1st Mortgage Holder = BANK B

Losses Avoided = Short Sale Offer - (Expected Value Post Foreclosure*Time Value Discount Factor) + Carrying Costs Potential Losses Avoided by B:

Property 3: $365k - ($345k*0.98) + $8k = $34.9k

Property 4: $590k - ($460k*0.98) + $16k = $155.2k

Aggregate: $34.9k + $155.2k = $190.1k

Losses Realized = Mortgage Amount Held by Junior Mortgage Holder

Potential Losses Realized by A:

Property 3's Mortgage Balance + Property 4's Mortgage Balance $25k + $55k = $80k

FIG. 4B

Summary of Proposed Swap

| Bank A | Bank B |
|---|---|
| Losses Avoided by A in Bundle 1: $84.1k | Losses Realized by B in Bundle 1: $80k |
| Losses Realized by A in Bundle 2: $80k | Losses Avoided by B in Bundle 2: $190.1k |
| Net from Swap: $84.1k - $80 = (+) $4.1k | Net from Swap: $190.1k - $80k = (+) $110.1 |

Additional Losses Incurred by Banks A and B if Swap Does Not Occur: $84.1k + $190.1k = $274.2k
(Assuming Short Sales Are Rejected Without the Swap)

FIG. 4C

SYSTEMS AND METHODS FOR FACILITATING FINANCIAL TRANSACTIONS INVOLVING BUNDLES OF PROPERTIES

BACKGROUND OF THE DISCLOSURE

1. Field of the Invention

The present disclosure relates to computer-implemented systems and methods for facilitating financial transactions of bundles of properties.

2. Description of the Related Arts

A mortgage is said to be "under water" if the outstanding balance on the mortgage exceeds the current value of the property mortgaged. In such a situation, a borrower of such a mortgage may seek a "short sale" in which he or she locates a buyer who offers to purchase the property at a price that is often below the outstanding balance of the mortgage. For example, if a house is currently worth about $375,000 and the mortgage owed on the house is $450,000, a short sale offer may be priced at $350,000. The mortgage holder would take a loss of $100,000 ($450,000-$350,000) if it accepts the offer. Although the loss would be substantial, the mortgage holder may nonetheless accept the short sale offer for a number of reasons, including the possibility of further losses if the property were to fall into foreclosure, or the possibility of further price decline in the property market. As such, the process of evaluating whether to accept a short sale offer often requires careful consideration of many factors, which prolongs the processing time of such transactions.

To further complicate the matter, in certain short sale situations there may exist multiple junior mortgages on the subject property, in which case all mortgage holders involved must agree to the short sale offer in order for the transaction to complete. The multiple-lien scenarios often force mortgage holders on the subject property into a stalemate in which an agreement becomes nearly impossible to reach due to the need for multiple parties to agree to take financial losses up front. When this occurs, short sale transactions are either delayed or prevented from occurring altogether, and the subject properties eventually wind up in foreclose and cause additional losses for all parties involved.

SUMMARY OF THE DISCLOSURE

The system, method, and devices disclosed herein each have several aspects, no single one of which is solely responsible for its desirable attributes. Without limiting the scope, the more prominent features of the various embodiments will now be discussed briefly.

Embodiments disclosed herein provide systems and methods for facilitating certain financial transactions involving bundles of properties. Several embodiments are directed to identifying properties that are potential candidates for short sale transactions and grouping them into bundles according to certain criteria. Other embodiments are directed to assessing the value of bundled properties such as real properties with multiple mortgages attached and pending short sale offers. In particular, the methods and systems disclosed herein provide an objective evaluation of bundles of real properties and their related mortgages, so that mortgage holders can have an accurate assessment of potential losses involved in short sale and foreclosure situations where multiple mortgages are involved. In those situations, the short sale proceeds are used to pay off the mortgages in order of priority, from the first mortgage to the second mortgage, and so on, in reverse order based on when a mortgage was initially placed on the subject property. However, short sale proceeds are often insufficient to pay off the entire first mortgage (or just enough to pay off the first mortgage), in which case any junior mortgage holders (i.e., second, third, fourth mortgage holders and so on) must agree to a release leading to a substantial or total loss before the short sale can be completed.

While a short sale typically results in losses for the various mortgage holders, those holders may nonetheless accept a short sale offer because of potentially greater losses if the offer is rejected. This is especially true in situations in which the borrower is already delinquent at the time of the proposed short sale. In those instances, the property is at risk of falling into foreclosure, which often brings with it transactional costs such as legal fees and various processing costs, as well as losses in the property value due to potential neglect or willful damage on the part of the borrower-home owner or others. Also, in certain geographic areas where property prices are declining, apart from the factors stated above, the property itself may worth substantially less at foreclosure (which may take place many weeks or months after the proposed short sale) due to market conditions.

In a simplified example, the systems and methods described in this disclosure provide a solution for two example banks, Bank A and Bank B, to mutually agree to release their second mortgage interests in two bundles of properties, Bundles 1 and 2. In Bundle 1, Bank A holds the first mortgages for all properties in the bundle while Bank B holds all the second mortgages. In Bundle 2, the situation is reversed, with Bank B holding all the first mortgages and Bank A holding all the second mortgages. Since, as described above, the lender holding a second mortgage is typically in a position to take a more substantial loss or a complete loss in a short sale while the first mortgage holder can potentially mitigate its losses by avoiding foreclosure, the bundling of properties enable financial institutions to offset second mortgage losses by gaining, on properties in which they hold first mortgages, the second mortgage releases of other financial institutions who may otherwise object to the short sale offers. The methods and systems provide a mechanism for assessing the aggregate value of each bundle to each institution using analytical models, and in certain instances calculate an offset amount to facilitate mutual releases when the bundles of properties are determined to differ in value to different lenders.

In one embodiment, the analytical models are based on a number of data sources including data on property values, borrowers' financial and credit status, mortgage status, recent sales, demographic information, historical property value trends, default rate information, and so on.

The various embodiments disclosed herein are not limited to valuation of properties involved in short sale and/or foreclosure situations. Indeed, there may be other situations in which financial institutions desire to gain an accurate picture of an aggregate value of a group of properties. For example, a bank may wish to exit/enter a certain market (e.g., a certain geographic region, a certain segment of the market) due to marketing, business, and/or risk management considerations. The bank may thus wish to either transfer a portfolio of home loans to another bank or acquire a portfolio. Various embodiments of the invention offer a transparent and objective valuation of a group of properties involved in any type of potential transaction. The provided valuation takes into account the potentially large number of variables that can affect property/mortgage portfolio valuation and thus empowers the parties to negotiate transactions that would be to their mutual interests.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like components are designated with like numerals throughout.

System Overview

Figure 1:
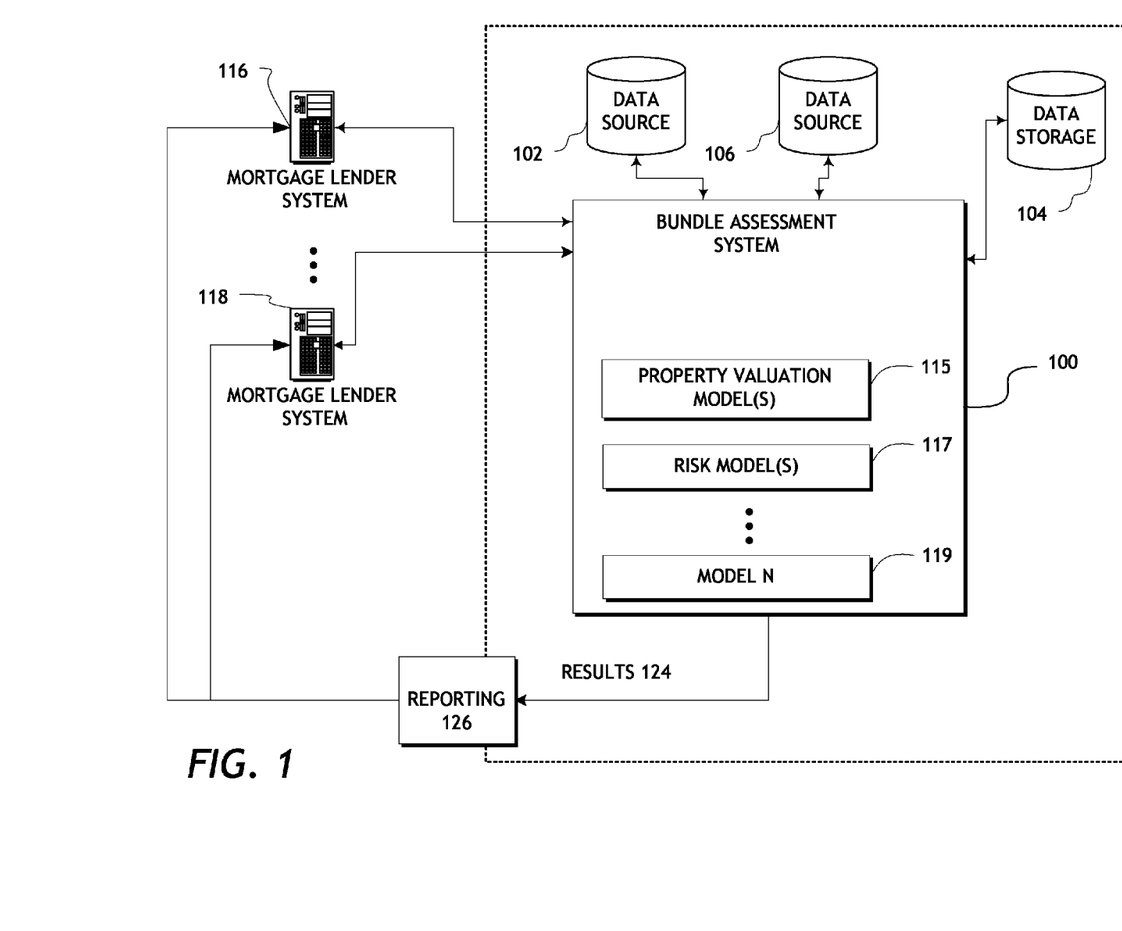
FIG. 1 is a functional block diagram illustrating a bundle assessment system in accordance with an embodiment.

FIG. 1 shows a bundle assessment system 100 that can provide a value assessment of the bundled properties, especially real properties that are at risk of entering the foreclosure process. The system 100 may be implemented as a programmed computer system that comprises one or more computers or computing devices (e.g., application servers, database servers, workstations, storage servers, etc.) that execute code modules. In one embodiment, the bundle assessment system 100 receives mortgage data from a plurality of mortgage lender systems such as systems 116 and 118 as shown. As such the system 100 serves as a clearing house of data for disparate lenders and their associated data systems. Although the term "mortgage lender" is used here, it will be understood that, due to the securitization of mortgages and the complexities of mortgage lending practices that many parties other than the original mortgage lenders may possess such mortgage information in their data systems. For example, the bundle assessment system 100 may serve as a "data clearing house" or central data repository in which mortgage holders/investors such as banks and/or other financial institutions provide their mortgage data. The mortgage data may include loan origination information, underwriting information, mortgage amounts, current balances, property information, default status, borrower credit information, etc. In one embodiment, data from these mortgage lenders/holders/investors are stored in data storage 104, which is in communication with the bundle assessment system 100. In one embodiment, the mortgage data also includes short sale offer data, which sets forth proposed short sale offers the financial institutions have received for subject properties of the mortgages held by those institutions. The housing of data from various lenders enables the creation of various bundles of properties based on lender-specific criteria. For example, the housing of such data may enable two lenders to mutually specify the creation of bundles out of properties in a certain state within a certain value range, and the system would be able to automatically group such properties matching those criteria into bundles and offer the corresponding valuation assessments to facilitate transactions between the two lenders. In another embodiment, data from one or more lenders may be provided "on-the-fly" or on an "as needed" basis so that data is received from those lenders just prior to a request for valuation.

In one embodiment, the received/stored mortgage data is cross-referenced with additional data received from data sources 102 and 106. Such additional data sources may include: public record data including property record data, recent sales data such as Multiple Listing Services (MILS) data, credit data such as borrowers' credit reports and/or scores available from a credit bureau, historical mortgage transaction data, foreclosure/default data, etc. Data from these data sources may be keyed or matched with the mortgage data through a variety of suitable methods, including matching by property addresses, borrowers' names and/or social security numbers, property numbers assigned by local government tax agencies, etc. These data sources may also include legal information such as federal and state laws and/or regulations governing the foreclosure process and borrowers' rights. These data sources may be queried periodically so that mortgage data may be updated. For example, the system 100 may monitor for any liens or encumbrances being placed on the subject properties referenced by the mortgage data in the data storage 104. In one embodiment, the monitoring of liens may be accomplished for example by using a data product such as the Lien Watch product available from Corelogic Information Solutions, Inc.

At least some of the input data described above is used to assess the value of the bundles. As will be described further below, the bundle assessment system 100 may use these data sources to assess the value of individual properties in the bundles in order to facilitate the process of securing mutual releases of junior mortgages among financial institutions in exchange for the completion of short sales to avoid foreclosure and its associated transaction costs and property value losses. It is noted that in certain situations, the holders of junior mortgages may be covered by mortgage insurances, so the release authority may rest with the insurance companies rather than the mortgage holders. In addition, decision on any single mortgage (whether primary or junior) may be subject to approval by multiple investors of that mortgage because of the securitization of mortgages. As discussed above, whereas a junior mortgage holder (Financial Institution 1) may refuse to agree to a short sale A that likely mitigates the losses of the primary mortgage holder (Financial Institution 2), Financial Institution 1 may nevertheless agree to short sale A if it could gain the release of a junior mortgage held by Financial Institution 2 in a different short sale B in which Financial Institution 1 holds the primary mortgage. While this exchange in principle would benefit both institutions, in practice it is difficult to evaluate whether this is a fair exchange since each short sale situation is unique and the financial calculations are affected by many variables. This difficulty is magnified when the proposed exchange or offset is performed on large bundles of properties. The bundle assessment system 100 solves this problem by assessing the value of each property/short sale offer and providing aggregate value assessments on bundles of properties/short sale offers so that financial institutions desiring such exchanges can make informed decisions on whether to proceed. In one embodiment, the bundle assessment system 100 also determines whether any payments need to be made to offset the differences in losses avoided/realized by the parties involved.

In one embodiment, the bundle assessment system 100 is configured to use a number of analytical data models to determine the value of individual properties in the bundles as well as potential financial losses avoided and/or realized by the parties involved in the proposed short sale transactions. For example, one or more property valuation models 115 may be used to assess the value of individual properties. In one embodiment, the valuation models 115 may take into account market conditions as indicated by recent sales. Example valuation models include the various Automated Valuation Models (AVMs) that are commercially available from Corelogic Information Solutions, Inc. An AVM may use data such as square footage and comparable sales to valuate a subject property, and the output may be used to evaluate whether the short sale offer is in line with market value. In one embodiment, the valuation models 115 may include models that are customized based on input provided by a financial institution involved. Thus, for example, two banks involved in a proposed swap of bundles may each offer its own customized valuation model. The two valuation models from the two banks may be separately applied, and the average of the two results may then be calculated to determine the valuation to be used for the swap transaction. In another embodiment, the parties involved in a bundle swap and/or a transfer of a bundle of properties may mutually agree to one or more valuation models. In one embodiment, at least some of those models may be blind in the sense that the inner workings of the model are kept confidential from the parties. In one embodiment, a distressed AVM is used. A distressed AVM operates like a regular AVM except the valuation is based on special parameters that are tailored for properties in distressed situations such as short sales and foreclosures. The special parameters take into account the negative effects the distressed situations may have on property values.

In another embodiment, another valuation model such as CoreScore™ from Corelogic Information Solutions, Inc. may be used. Generally speaking, CoreScore™ rates a subject property in terms of its desirability as an investment property. Thus it takes into account factors in the local market such as: strength of the local property market, nearby school quality, local occupancy rate and/or rental market trends, crime rate, demographic makeup, etc. In one embodiment, a valuation model such as CoreScore™ can indicate to the parties (e.g., the lenders) whether the property is a good potential investment property. If the property has a good score and the short sale offer is low (e.g., as compared to the AVM assessed value), it may be a warning sign that the short sale buyer is potentially underbidding on the property in order to quickly re-sell it at a higher price (a practice known as "flipping"). As such, a CoreScore™ (or a score generated by a similar valuation model) can serve as a guard against flipping. This concern is especially relevant for a secondary lien holder, who, when faced with a short sale offer, needs to decide whether there is a genuine risk of greater losses in the future or whether there is potential gamesmanship on the part of the short sale buyer. The secondary lien holder needs to consider these factors when deciding whether to agree to the short sale and write off losses. In one embodiment, CoreScore™ (or a similar model) may output a numerical score. In another embodiment, the score may be a letter grade such as "A" through "F." In other embodiments, other models from Corelogic Information Solutions, Inc. such as Collateral Manager™ and LoanSafe™ may be used in place of, or in conjunction with, CoreScore™ to guard against the risk of accepting a short sale offer made by a buyer intending on flipping the property.

In addition, the bundle assessment system 100 may also use one or more risk models 117 to determine the likelihood of default in the near future if the short sale is rejected. Such risk models 117 may use credit information, employment information, etc. of the borrowers to determine the likelihood of default. Example risk models include various risk models that are commercially available from Corelogic Information Solutions, Inc. such as DefaultRisk™ and the LoanSafe™ suite of data model products. A high default risk may indicate to the parties, especially the secondary mortgage holder, that losses are likely and thus it may be a good idea to write off the losses by agreeing to the short sale. As depicted, a number of other models may be used, and results 124 may be combined and/or aggregated for the bundles. For example, an output may indicate that, for exchanging two bundles of 100 properties each, Financial Institution 1 should pay $125m to Financial Institution 2 because the proposed short sale transactions of those two bundles would favor Financial Institution 1 by $125m. In one embodiment, the results 124 may be reported by a reporting module 126 back to the mortgage lender systems 116 and 118. As shown in FIG. 1, apart from models 115 and 117, the bundle assessment system 100 may also use a number of other analytical models (represented by the ellipsis and the model N 119) to assess the bundle values. Such other models include Loan-to-Value (LTV) models, models that calculate offset amounts in bundle exchanges, and models that adjust projected losses based on a variety of factors such as state/local laws concerning the subject properties/mortgages. A LTV model such as TrueLTV™ from Corelogic Information Solutions, Inc. can offer a lender a ratio of the real-time value of the property compared to a total amount of loan(s) borrowed against the property. LTV provides another indicator on whether it is a good idea to accept a short sale offer. For example, a homeowner with a high LTV ratio may be more likely to be a good candidate for a short sale, since the high LTV ratio may indicate a higher likelihood of default. As with the valuation models, the other aforementioned models including risk models may be customized by at least one party to a proposed transaction.

Assessment Processes

Figure 2A:
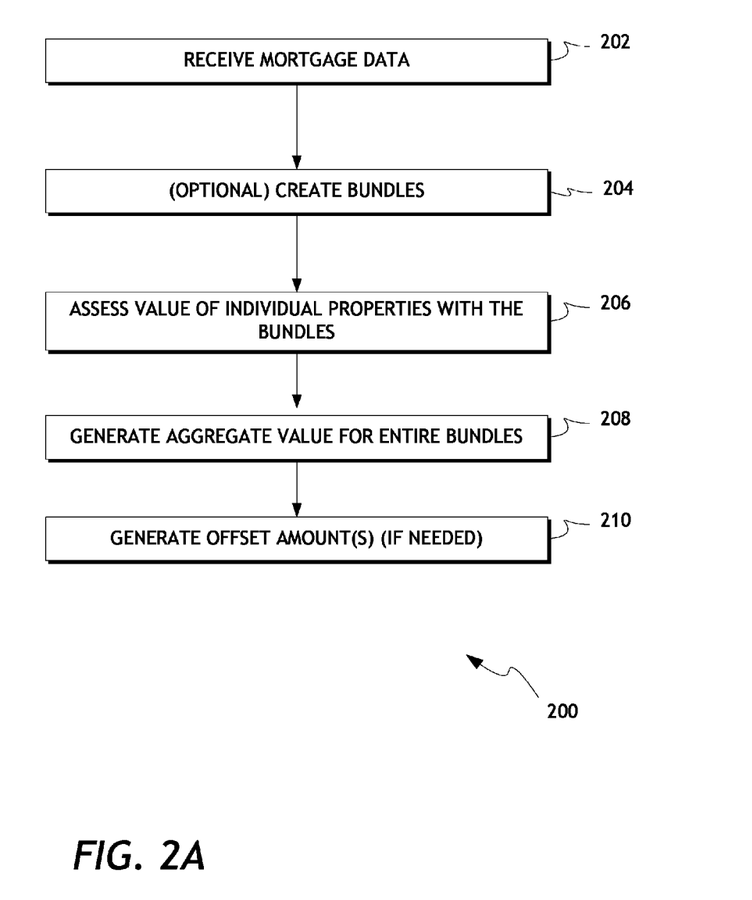
FIG. 2A is a flowchart illustrating the operation of the bundle assessment system in accordance with an embodiment.

FIG. 2A is a flowchart illustrating the operation of the bundle assessment system in accordance with an embodiment. In block 202, the value assessment system receives mortgage data and other related data as discussed above. In block 204, the value assessment system may create bundles in accordance with certain input criteria specified by the lenders or mortgage holders. This is optional because in most instances the bundles are already indicated in the mortgage data received in block 202. However, certain lenders may specify the creation of bundles by a certain geographic region, for example, to see whether an agreement may be reached with other lenders with properties in the same geographic region. In addition, some lenders may want to maximize the number of properties in a bundle, while other lenders may want to maximize the overall market value of a bundle. In one embodiment, for example, two lenders may provide a number of such geographic and financial criteria, and the bundle assessment system will attempt to create proposed bundles of properties of equal aggregate values to the lenders based on those criteria. If such bundles of equal values cannot be created, one or more offset amounts may be provided along with the proposed bundles, as further described in conjunction with the examples depicted in FIGS. 4A-4C. In other embodiments, the bundle assessment system may suggest such bundles to the lenders based on prior bundle swap transactions, without being prompted by specific lender-provided criteria.

In block 206, in one embodiment, the value assessment system assesses the value of individual properties within the bundles. In block 208, the value assessment system generates aggregate value(s) for the entire bundles and calculates any offset amounts if needed in block 210. Further details on how such values are assessed will be provided in conjunction with FIGS. 3 and 4 below.

Figure 2B:
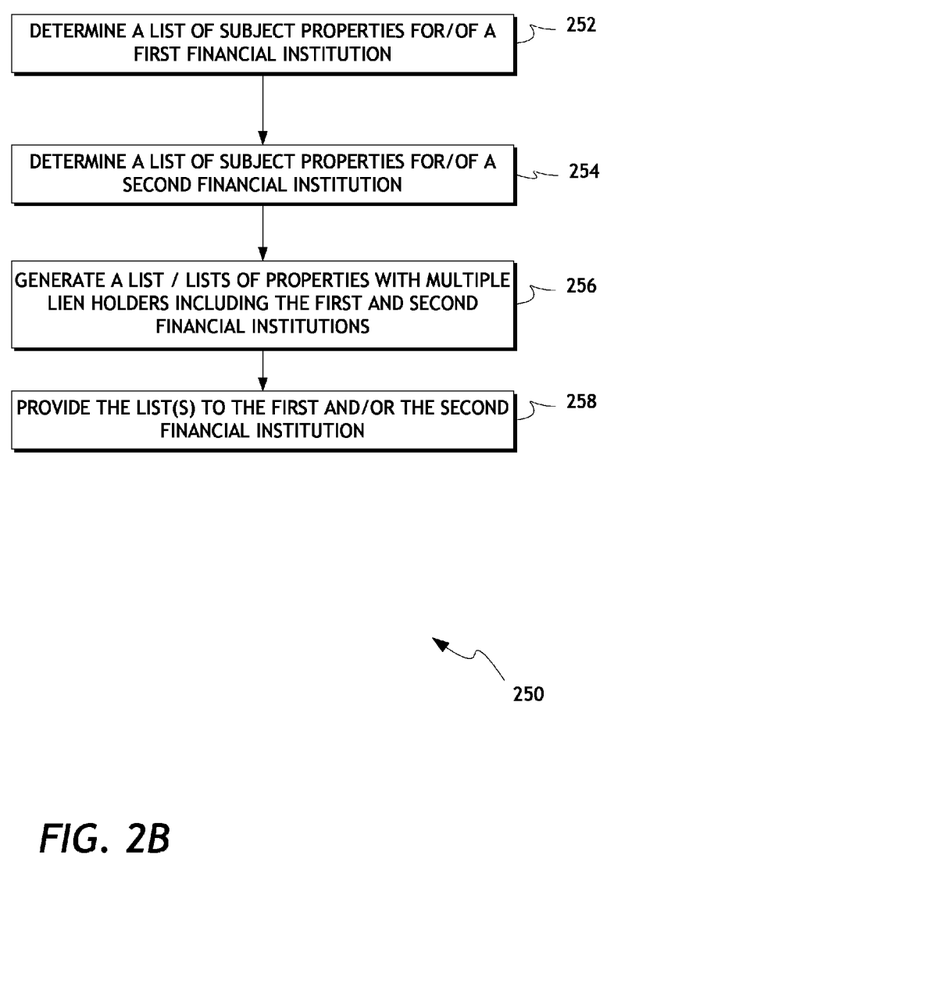
FIG. 2B is a flowchart illustrating the operation of the bundle assessment system in accordance with another embodiment.

FIG. 2B is a flowchart illustrating the operation of the bundle assessment system in accordance with another embodiment. In block 252, the process 250 determines a list of subject properties for/of a first financial institution. As discussed above with reference to FIG. 2A, the determining can be based on a number of criteria such as geographic boundaries and the number of properties. For example, the first financial institution may specify criteria such as all properties in California with short sale offers between $250,000 and $650,000 in which the first financial institution is the primary or secondary mortgage holder. In block 254, the process determines a list of subject properties for/of a second financial institution. Again, the list may be determined based on certain criteria, for example, all properties in California with short sale offers between $500,000 and $850,000 in which the second financial institution is the primary or secondary mortgage holder. In block 256, the process generates a list of properties with multiple lien holders including the first and second financial institutions. In the example above, the list from block 256 may be an overlap between the two lists from 252 and 254, as shown below.

| Matching Properties, in California, with short sale offers between $500,000 and $650,000 | |
|---|---|
| Primary Mortgage Holder: Financial Institution 1, Secondary Mortgage Holder: Financial Institution 2 | 34 Matching Properties |
| Primary Mortgage Holder: Financial Institution 2, Secondary Mortgage Holder: Financial Institution 1 | 56 Matching Properties |

In one embodiment, several lists may be determined in block 256. For example, the 34 properties may be on a first list and the 56 properties may be on a second list. In addition, in some embodiments, the bundle assessment system may further divide the list(s) by location (e.g., city, county), price range, or other filtering criteria. Finally, in block 258, the process provides the list(s) from block 252, 254, and/or 256 to the first and/or the second financial institution, so as to facilitate negotiation between the financial institutions so they can engage in mutually beneficial transactions such as the bundle swapping transactions discussed above. Optionally, the bundle assessment system may provide one or more valuation and/or risk indicators along with the list(s) of properties, as discussed elsewhere in the disclosure.

In some embodiments, in blocks 254 and 256, several lists may be determined based not on input from a specific second financial institution but rather on financial institution(s) identified from the list from block 252. For example, a first financial institution (Bank 1) may specify a list of properties matching the criteria of properties being in California, with short sale offers less than $1 million, and in which Bank 1 is the primary mortgage holder. In this example, 246 matching properties are identified. In block 254, the "second financial institution" would be a financial institution holding a secondary mortgage in the list of 246 properties. If there are three different such banks that hold secondary mortgages among the 246 properties of Bank 1, three lists may be generated in block 256 according to the example below:

| List of Properties Where Bank 1 is the Primary Mortgage Holder, Properties in California, Short Sale Offers Less Than $1 million | |
|---|---|
| List 1: Secondary Mortgage Holder: Bank 2 | 56 |
| List 2: Secondary Mortgage Holder: Bank 3 | 156 |
| List 3: Secondary Mortgage Holder: Bank 4 | 34 |
| Total No. of Properties Matching Bank 1's Criteria | 246 |

As shown in this example, three lists are determined: one for Bank 2, one for Bank 3, and one for Bank 4. In another embodiment, additional swapping lists could be determined. In the above example, three such swapping lists could be determined, and each such list would include properties in which the situation is reversed, i.e., where Bank 1 is the secondary mortgage holder and the other bank (Bank 2, 3, or 4) is the primary mortgage holder. The various lists of properties may be provided in block 258 to Bank 1 (or the other banks) so Bank 1 can approach Banks 2, 3, and/or 4 to discuss possible transactions such as bundle swapping. Again, in some embodiments the bundle assessment system may provide one or more valuation and/or risk indicators along with the list(s) of properties to facilitate negotiation among the parties.

Figure 3:
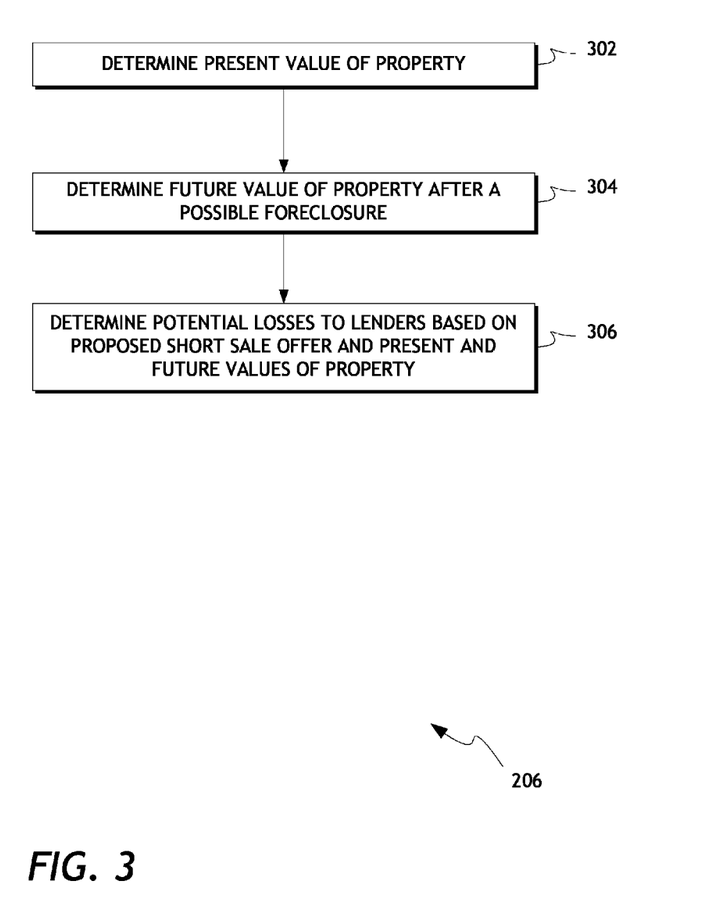
FIG. 3 is a flowchart illustrating a method of valuating an individual property and short sale offer in accordance with an embodiment.

FIG. 3 is a flowchart illustrating a method of valuating an individual property and short sale offer in accordance with an embodiment. The process begins in block 302, where the bundle assessment system determines the present value of the subject property. In block 304, the bundle assessment system determines the expected value of the property if it goes into foreclosure in the future. Then in block 306, the bundle assessment system determines potential losses avoided or realized by the lenders based on proposed short sale offer and the calculated values of the property. The losses avoided would be the amount of losses avoided by taking the proposed short sale offer and avoiding further losses resulting from the property falling into foreclosure. In a simple example, not taking into account carrying costs of foreclosure, if the short sale offer on the property is $450,000 today and the property is expected to be worth $350,000 post foreclosure and the first mortgage balance is $450,000, the losses avoided by the first mortgage holder would be $100,000.

The losses realized would be the amount realized by accepting the short sale offer. In the same example above where the first mortgage balance is $450,000, if there is a second mortgage of $150,000 held by a separate financial institution, the losses realized by that financial institution in accepting the short sale offer would be $150,000 since the short sale offer ($450,000) is only enough to pay off the first mortgage ($450,000). If the first mortgage is $250,000 and the second mortgage is also $250,000, the losses realized would be only $50,000, since the $450,000 short sale offer would be used to pay off the first mortgage in full and leave $200,000 for the second mortgage holder. It is noted that this is a simplified teaching example and that other factors, as further described below, may affect the ultimate assessment of the losses avoided or realized by the parties involved.

Those skilled in the art will appreciate that in various embodiments, the actual steps taken in the processes shown in FIGS. 2A, 2B, and 3 may differ from those shown in the figures. Depending on the embodiment, certain of the steps described in the examples above may be removed, others may be added, and the sequence of steps may be altered and/or performed in parallel. In addition, each of the depicted processes may be performed, in whole or in part, by the bundle assessment system 100 (or a similar computing system), which may be distributed across multiple distinct computers or computing devices that are interconnected on a network, and which collectively operate as a risk assessment computing system or machine. Those skilled in the art will also appreciate that certain steps shown in FIGS. 2A, 2B, and 3 may be performed manually, and different steps may be performed by different parties or computing systems under the control of different parties.

Example Assessment

Figure 4A:
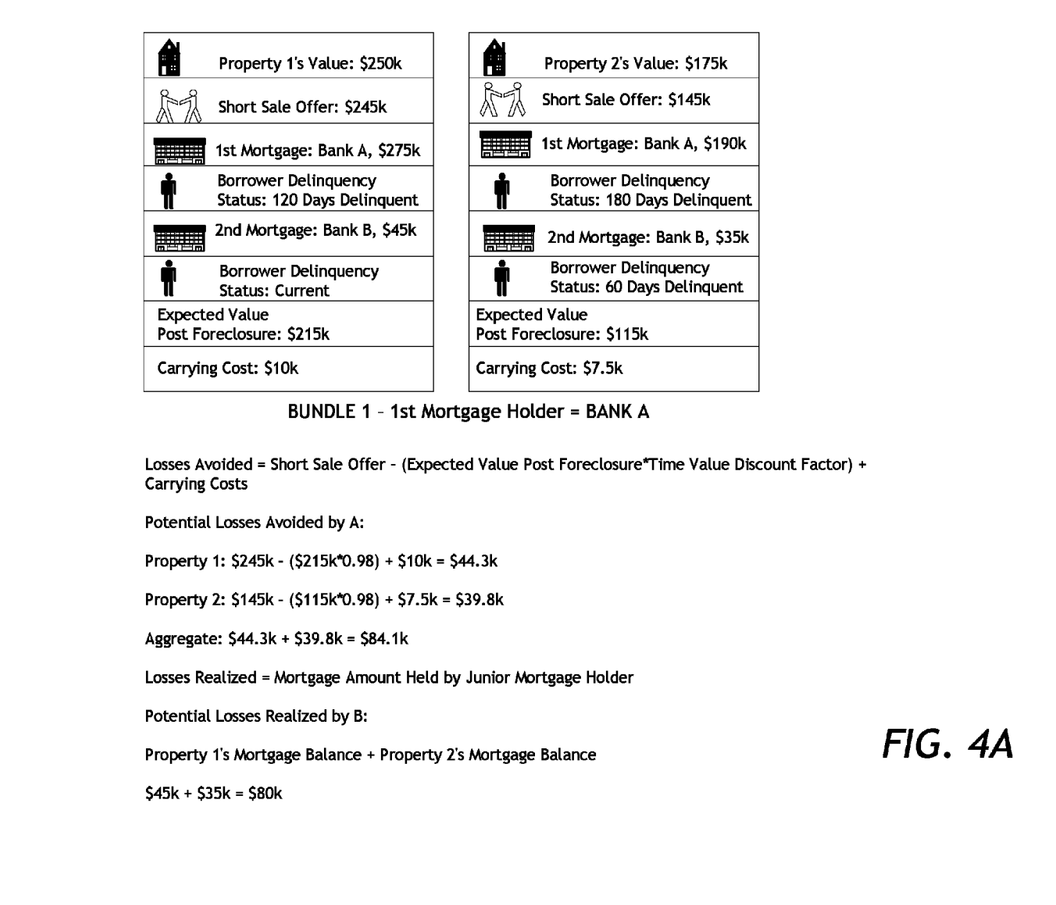
FIGS. 4A-C illustrate the valuation of two example bundles of properties in accordance with an embodiment.
Figure 4B:
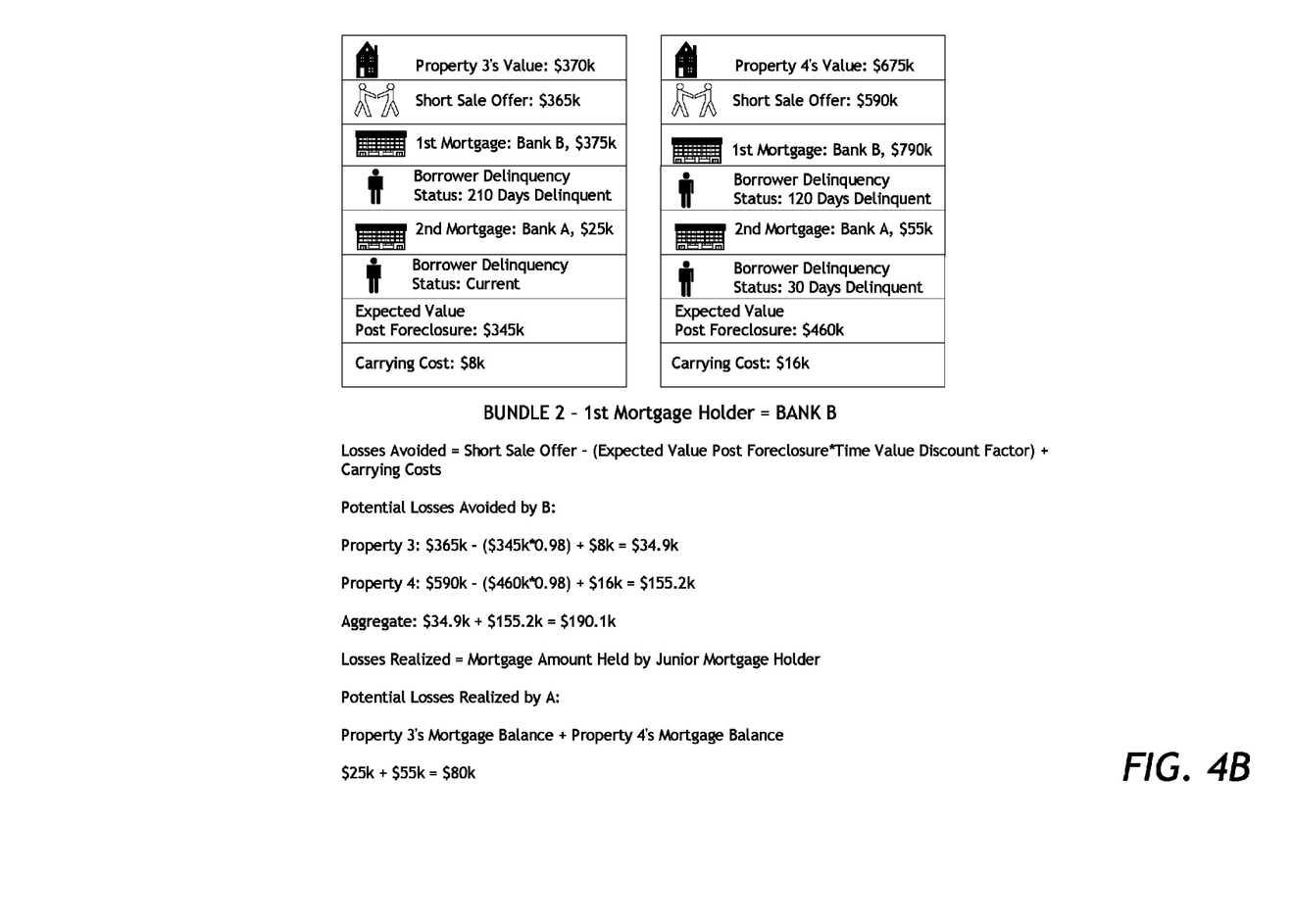
Figure 4C:
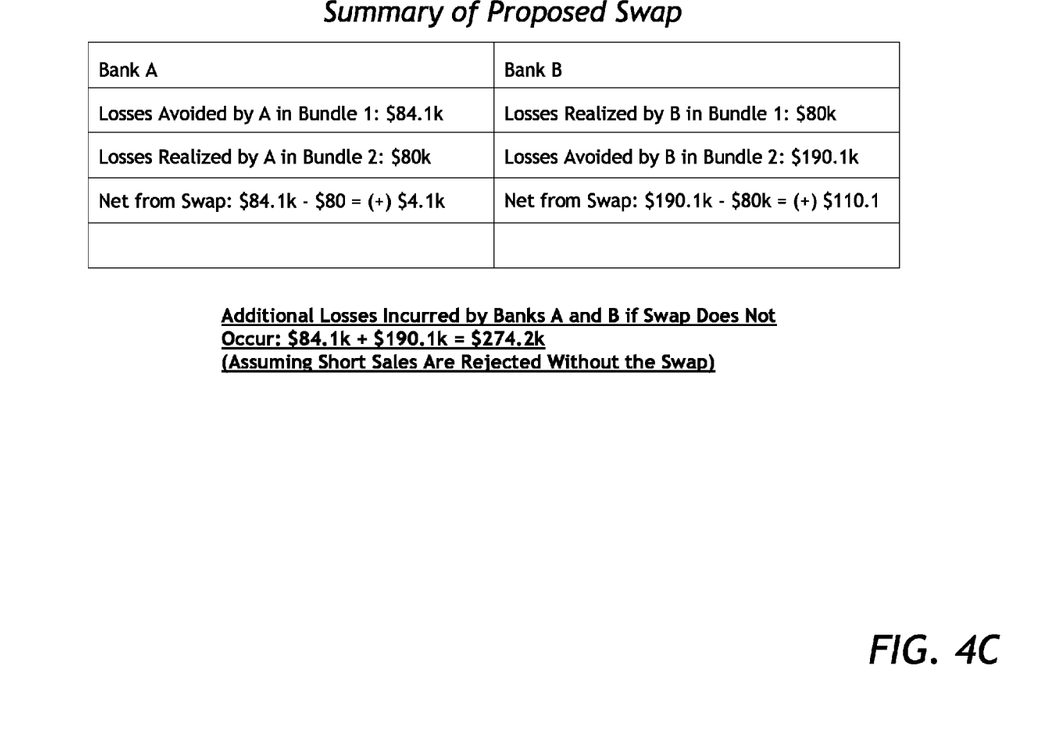

FIG. 4A-4C illustrate two bundles of real properties to provide further details on how such bundles are assessed by the bundle assessment system in accordance to one embodiment. FIGS. 4A and 4B each shows an example bundle consisting of two properties. In the properties within Bundle 1, Bank A holds the first mortgage while Bank B holds the second mortgage. In the properties within Bundle 2, Bank B holds the first mortgage while Bank A holds the second mortgage. Each property entry in the figures shows details on the property including the present property value, the borrower's delinquency status, the short sale offer, and the first and second mortgage balances, and so on.

In deriving an assessment of each individual property/short sale offer, the bundle assessment system in one embodiment takes into account a variety of variables that makes evaluating short sale offers difficult for individual financial institutions. These variables are further discussed below.

Present Property Value

The bundle assessment system in one embodiment derives a present property value through the use of one of more property valuation model(s) 115. The property valuation may take into account a number of factors, including property attributes as indicated by the public records (number of rooms, square footage, etc.), condition of the property, recent sales, neighborhood property value trends, demographic data, and so on. The bundle assessment system in one embodiment also takes into account the quality of the underwriting since it could also affect the present property value, as well as the property value post foreclosure.

Expected Property Value Post Foreclosure

The bundle assessment system in one embodiment also derives an expected property value through the use of one of more model(s) as shown in FIG. 1. These models may focus on the following components that contribute to the expected property value post foreclosure.

Likelihood of Foreclosure

For example, one of the models may be a risk model 117 that evaluates the likelihood the property will go to foreclosure absent the short sale. It takes into account the borrower's current financial status by evaluating a number of data points, including delinquency status (whether it has occurred and if so, the days past due and the amount), the borrower's current credit score, the borrower's current employment status, and the borrower's current financial condition including income. The evaluation may also incorporate historical data such as changes in the borrower's credit score overtime, as well as those data points collected at the time of loan origination. In one embodiment, the model determines a likely outcome by comparing the borrower's data to other historical mortgage data in which default outcomes are known.

Distressed Property Valuation Model

A distressed property valuation model may be used to estimate the expected market value of the property should it go into foreclosure. The distressed property valuation model may use some or all of the property data used by the property valuation model to determine the present value, as described above. In addition, the distressed property valuation model may be based on market data such as the number of expected Real Estate Owned (REO) properties on the market, the Days on Market (DOM) data for those properties.

Other Factors

The bundle assessment system may also take into account other factors that may affect the property value after the foreclosure. These factors may include:

the presence or absence of liens on the property (e.g., tax lien, mechanic's lien), the risk of property damage as a result of intentional damage inflicted by the current occupants, vandalism and/or neglect after the property becomes vacant, the transactional costs of foreclosure (e.g., legal costs, etc.), servicing fees and payments due to investors, and other factors.

Mortgages and Short Sale Offer

The bundle assessment system in one embodiment also takes into account the mortgages attached to a property and the associated short sale offer to derive a proper assessment of the potential losses avoided or realized if the short sale offer is accepted. This is illustrated in the example Property 1 shown in FIG. 4A, where Bank A holds a first mortgage of $275,000 and Bank B holds a second mortgage of $45,000. The short sale offer is $245,000 and the value of the property is expected to be at $215,000 post foreclosure. If the short offer is accepted, Bank A stands to avoid a loss of $30,000 whereas Bank B will face a total loss in either situation.

Carrying Costs

Generally speaking, a carrying cost is defined as the cost of maintaining a financial/business position. As used in the various embodiments of the invention, carrying costs are the costs associated with rejecting a short sale offer (i.e., maintaining the status quo) on a subject mortgage. As such, the carrying costs may include, but are not limited to, transactional costs associated with the foreclosure process, costs for paying outstanding liens (e.g., tax liens, mechanic's liens) and governmental fees/taxes such as property taxes, property repair/maintenance costs, costs for services associated with processing the foreclosure and resale of the property (e.g., real estate agents), etc. In the various embodiments, the various data models take the carrying costs into account when the bundles of properties are evaluated.

Aggregate Assessment

FIGS. 4A-4C illustrate two example bundles of properties that are evaluated for a potential swap in accordance with one embodiment. As shown in the simplified example of FIG. 4A, for Bundle 1, the aggregate losses avoided by Bank A (if the short sale offers are accepted) as determined by the system is $84,100. In one embodiment, the losses avoided are calculated as:

$$\text{Short Sale Offer} - (\text{Expected Value Post Foreclosure} * \text{Time Value Discount Factor}) + \text{Carrying Cost}.$$

The difference between the short sale offer and the expected value post foreclosure represents the losses avoided by A (the primary mortgage holder) if the short sale offer is accepted. In Property 1, for example, A stands to recover $275,000 at the short sale versus only $215,000 after the foreclosure. The expected value post foreclosure in one embodiment is based on the distressed property valuation model as discussed above and takes into account a number of factors such as current market value, comparable sales, expected foreclosure date, etc., as well as those factors already enumerated above. In one embodiment, the expected value post foreclosure is multiplied by a time value discount factor because the expected post foreclosure value is a future value that needs to be discounted to a present value for comparison with the present short sale offer.

As shown in the equation above, the carrying cost is added to the difference between the short sale offer and the discounted expected value post foreclosure because accepting the short sale offer now allows the primary mortgage holder to avoid the carrying cost associated with rejecting the offer. In this example, the $10,000 carrying cost for Property 1 may include the transactional costs of processing the foreclosure of Property 1 if it lapses into foreclosure.

On the other hand, if the short sale offers are accepted, the losses realized by Bank B in Bundle 1 is determined to be $80,000, which is simply a sum of the mortgage amounts held by Bank B. This is because in both Properties 1 and 2, the short sale amounts are not enough to pay Bank A, the primary mortgage holder. So all junior mortgage holders including Bank B will take a total loss.

FIG. 4B depicts a Bundle 2 in which the situation is reversed, with Bank B being the primary mortgage holder for each property in the bundle and Bank A being the junior mortgage holder. The figure shows that Bank B would avoid losses of $190,100 while Bank A would realize losses of $80,000 if the short sale offers are accepted.

FIG. 4C shows a summary of the financial numbers for Banks A and B in a proposed swap of the two bundles of properties (i.e., mutually agreeing to all short sale offers for the properties in the bundles despite junior mortgage losses). Since the outcomes for each bank differ, an offset payment may be needed to make the swap fair. For example, to secure mutual agreement on the short sale offers for the two bundles of properties, an offset could be calculated as follows:

Bank A: Losses Avoided in Bundle 1($84,100)−
Losses Realized in Bundle 2($80,000)=+$4,100.

Bank B: Losses Avoided in Bundle 2($190,100)−
Losses Realized in Bundle 1($80,000)=+$110,100.

Thus to be a fair exchange, Bank B would pay Bank A the calculated offset amount of $97,000, the difference in their respective outcomes ($110,100-$4,100). In some embodiments, the bundle assessment system would create bundles in which such differences are minimal or non-existence to minimize the actual offset amount that has to be paid by one party to another.

The above simple example illustrates the advantages of bundling short sale offers and providing aggregate value assessments of the bundles to the parties involved. With the assessment provided by the system described in this disclosure, Banks A and B are now in a position to evaluate their potential gains and losses with objective numbers from a third party. In particular, it is notable that in the absence of such bundling and the value assessments provided, neither bank would be inclined to approve an individual short sale offer in which it is holding a junior mortgage. In the example of FIGS. 4A-4C, the lack of short sale approval could lead to foreclosures, which would result in additional losses to both parties. For example, by this bundling process, an aggregate amount of $274,200 of losses can be avoided (losses avoided by A ($84,100)+B ($190,100)). In real life applications where bundles of hundreds or thousands of properties are evaluated, the total amount of losses avoided by facilitating short sales before foreclosure could reach into billions of dollars. This is not to mention the ancillary saving on staff resources and overhead gained by the financial institutions by avoiding foreclosures. Although FIGS. 4A-4B illustrate one example method of obtaining a valuation of a bundle of properties, one skilled in the art will recognize that various other bundle valuation methods are possible. As further illustrated below, embodiments of the invention include several other valuation methods. For example, as described below, a second valuation method may use additional discount/adjustment factors that are correlated with a likelihood of default. In addition, as also described below, other valuation methods may provide additional indicators such as legal information related to the mortgages and suggested promissory note amounts.

In other embodiments, the bundle assessment system may calculate and provide other offset amounts. For example, in the above example, Banks A and B can specify that the offsets be calculated based on other figures such as the aggregate losses avoided or losses realized. In addition, the bundle assessment system may take into account the different likelihoods of default for the individual properties. In one embodiment, a loss amount (whether avoided or realized) for a property may be discounted by a certain multiplier based on the likelihood of the property ending up in a foreclosure. For example, if there are two properties X and Y with an identical projected loss amount but X has a 20% chance of ending up in a foreclosure and Y has a 90% chance, the bundle assessment system would adjust the losses related to the properties so that losses related to X are valued less than those related to Y. This could be accomplished by discounting the losses through a multiplier as discussed above (e.g., the actual foreclosure likelihood percentage or the percentage in conjunction with another adjustment factor). This adjustment further helps the parties acquire a more realistic assessment of the financial implications involved in the swapping of property bundles. In one embodiment, other adjustment factors may be used and they may include those based on outputs from various models described above in conjunction with FIG. 1, such as AVM, CoreScore™, LoanSafe™, LTV™, or similar models. For example, a property deemed to be at risk of a flipping short sale offer may be excluded from a bundle altogether or have its potential losses avoided amount discounted by a factor.

In one embodiment, the various offset calculations may be customized by the parties involved in the swap. In another embodiment, a set of several offset numbers may be presented to the parties to facilitate negotiation between them. In one embodiment, instead of determining the value of preset bundles of properties, the bundle assessment system may instead create a bundle definition based on input criteria agreed upon by two or more parties. For example, two banks may mutually agree to pre-authorize a short sale of certain properties pursuant to certain geographic limitations (e.g., properties in a certain state) and/or value limitations (e.g., junior mortgage less than $100,000). Other limitations such as maximum/minimum potentially losses avoided/realized, the presence/absence of mortgage insurers, etc. may be used as well. In this alternative embodiment, instead of creating bundles of properties and valuating the bundles as discussed above, the system will record short sales approved/transacted based on the agreed-to bundle definition and pre-authorization and will instead tally the aggregate valuations after the short sale approvals/transactions. In the aforementioned example, the system may tally the short sale approvals/transactions periodically (e.g., quarterly) and provide the two banks one or more aggregation valuations/offset calculations based on the short sales that were approved/transacted during the period.

Additional Consideration: State Laws and Regulations

In one embodiment, the bundle assessment system provides information and assessment in addition to those illustrated in the example above. For example, in one embodiment, the bundle assessment system examines the related local laws and regulations concerning the individual mortgages in the bundles and provides adjusted values based on the local legal information. The bundle assessment system may receive such local legal data (e.g., state foreclosure laws) from the data source 102 or 106 (shown in FIG. 1).

For example, in certain states in the United States, the junior mortgage holders may be allowed to seek deficiency judgments at foreclosure (i.e., recover from the borrowers the outstanding loan balances not covered by the foreclosure proceeds). For example, returning to Property 1 of FIG. 4A, if the property is located in such a state, Bank B may seek a deficiency judgment against the borrower for $45,000 since the foreclosure proceeds are insufficient to pay Bank B. However, laws in other states do not allow for such deficiency judgments. Therefore, in one embodiment, the bundle assessment system may recommend a promissory note amount to Bank B where a deficiency judgment is not available. For example, if Property 1 is located in a state where deficiency judgment is not available, the bundle assessment system may recommend that Bank B seek a $10,000 promissory note from the borrower to mitigate the loss to be suffered by Bank B, in exchange for Bank B agreeing to the short sale. In one embodiment, the bundle assessment system may base this recommendation also on the credit status of the borrower. For example, the bundle assessment system may recommend the promissory note if the borrower has a good credit history/current credit score that meets a certain minimum threshold. The recommendation may also be based on the difference between the property value and the outstanding loan amounts.

In other embodiments, the bundle assessment system may indicate the presence or absence of, or account for, other local laws and regulations that could affect the valuation of the properties in the bundles. In some embodiments, properties from locales with the same or similar foreclosure laws and regulations are bundled together to facilitate ease of swapping, in addition to the other bundling criteria previously discussed above. Other state- or locale-specific laws or regulations such as the availability of redemption at foreclosure, foreclosure moratorium, or special rules concerning Mortgage Electronic Registration Systems (MERS) related mortgages may also be taken in account as well.

Additional Consideration: Delinquency Status

In addition to providing the promissory note recommendation, in one embodiment the bundle assessment value system may also take into account the default statuses of the mortgages for the given property. It is commonly observed that many borrowers who are delinquent on their primary mortgages are often current on their junior mortgages. For example, in Property 1 of FIG. 4A, the borrower is 120 days delinquent in his first mortgage to Bank A and yet is current in his second mortgage to Bank B. This situation provides even less incentive for Bank B (the junior mortgage holder) to agree to the short sale, since B is in a position to forgo a current account. By contrast, in Property 2, the borrower is delinquent to both Banks A and B. Thus, the bundle assessment system may take this factor into consideration in the bundle valuation. For example, for Property 1, the system may either increase the recommended promissory note amount to B or augment the value of the losses to Bank B by a certain multiplier. For Property 2, the system may decrease the recommended promissory note amount to B or discount the value of the losses to Bank B by a certain multiplier.

Other Applications

The various embodiments disclosed herein are not necessarily limited to valuation of properties involved in a short sale situation. There may be other situations in which financial institutions may desire to gain an accurate picture of an aggregate value of a group of properties. For example, a bank may for strategic business reason wish to exit a certain market (e.g., a certain geographic region) and may wish to sell a portfolio of home loans to another bank. In such as situation, embodiments of the invention may be applied to (1) identify, within the portfolio, properties in which the bank is a junior mortgage holder, (2) perform the aforementioned valuations, and (3) with the valuations, bundle those properties by their primary mortgage holders. This is performed so that the bank may contact those primary mortgage holders to discuss possible swap of properties as discussed above or a buyout based on the aggregate amount of junior mortgage interests to be released by the bank. The swap may be based on a condition other than a short sale offer. For example, the swap may be based on locating like properties in a different state. For example, the aforementioned bank (Bank 1) may be a junior mortgage holder in ten properties in California and the various embodiments may identify eight properties with a comparable aggregate value in Nevada in which a different bank (Bank 2) may be holding the junior mortgage. Thus, Bank 1, desiring to exit the California market, may use embodiments of the invention to identify a proposed swap so it can become the junior mortgage holder for those eight properties in Nevada and Bank 2 can become the junior mortgage holder for those ten properties in California. Alternatively, embodiments of the bundle assessment system can provide an estimated value of the junior mortgage interests of the ten properties in California so that Banks 1 and 2 and negotiate a buyout amount based on the estimated value (instead of the swap). Furthermore, embodiments of the invention may identify for potential buyer Bank 2 the primary mortgage holders of those ten properties in California and, if short sale offers are present, may propose any bundles for swapping between Bank 2 and those primary mortgage holders. In one embodiment, the value assessment of those ten and eight properties and their associated mortgages may include some or all of the previously mentioned factors described above such as borrower's credit status, mortgage delinquency status, estimated value at foreclosure, etc.

Other embodiments may target the reverse situation and (1) identify, within Bank 1's portfolio, properties in which the bank is a primary mortgage holder, (2) perform the aforementioned valuations, and (3) with the valuations, bundle those properties by their junior mortgage holders. Bank 1 can then approach those junior mortgage holders for potential swaps or buyouts. In either case, the various embodiments will facilitate exchange/transfer/release of various mortgage interests for the various financial institutions involved.

Implementations/Alternative Embodiments

The various functional blocks shown in FIG. 1 may be implemented in computer hardware (e.g., one or more computers, computer processors, or other units of computing machinery) programmed with executable code modules. The code modules may be stored on any type or types of computer storage devices or computer-readable media (e.g., hard disk drives, optical disk drives, solid state storage devices, etc.), and may embody (i.e., direct the computer hardware to perform) the various steps and functions described herein. In some embodiments, the various code modules of the system 100 may be distributed across multiple distinct computers or computing devices that are interconnected on a network, and which collectively operate as a risk assessment computing system or machine. The scores and other data generated by the various models, including the data models shown in FIG. 1 such as the property valuation models 115 or the risk models 117, may be stored by transforming the electrical, magnetic, or other states of physical storage devices. Although preferably implemented in program modules, some components of the system 100, such as specific models, may alternatively be implemented in-whole or in-part in application-specific circuitry (e.g., an ASIC or FPGA) or other special purpose hardware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially. Further, in some embodiments, certain components of the disclosed systems may be omitted.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Conclusion

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method for assessing the value of a set of real properties, the method comprising:
    receiving data related to a set of properties, wherein each property is associated with two or more mortgages and a short sale offer;
    for each property in the set of properties,
        determining, by a computer system that comprises one or more computing devices which comprise one or more hardware processors, an expected property value if the property falls into foreclosure;
        determining, by the computer system, potential losses avoided by a holder of a primary mortgage associated with the property if the short sale offer is accepted, the determining based at least partly on the determined expected property value and an offer amount of an associated short sale offer; and
        determining, by the computer system, potential losses realized by a holder of a junior mortgage associated with the property if the short sale offer is accepted, the determining based at least partly on the determined expected property value and the offer amount of the associated short sale offer;
    identifying, by the computer system, a first plurality of properties, within the set of properties, in which a first financial institution is a holder of primary mortgages associated with the first plurality of properties and a second financial institution is a holder of junior mortgages associated with the first plurality of properties;
    identifying, by the computer system, a second plurality of properties, within the set of properties, in which the first financial institution is a holder of junior mortgages associated with the second plurality of properties and the second financial institution is a holder of primary mortgages associated with the second plurality of properties; and
    determining, based on the determined potential losses avoided and realized for each property in the first and second pluralities of properties, aggregate amounts of losses avoided and losses realized for the mortgage holders for the first and second pluralities of properties, to facilitate an exchange of mutual release of junior mortgages by the first and second financial institutions to facilitate short sales of the first and second pluralities of properties.

2. The method of claim 1, further comprising:
    for one or more property in the set of properties,
        determining an availability of a deficiency judgment for the property based at least in part on foreclosure laws of the state in which the property is located; and
        in response to determining that a deficiency judgment is not available, determining a recommended amount of a promissory note from a borrower of a junior mortgage associated with the property to the junior mortgage holder.

3. The method of claim 2, wherein the recommended amount of the promissory note is further determined based on a credit status of the borrower.

4. The method of claim 2, wherein the recommended amount of the promissory note is further determined based on a delinquency status of the junior mortgage.

5. The method of claim 1, wherein determining the aggregate amounts of losses avoided and losses realized comprises determining an offset amount to account for differences between the aggregate losses avoided and losses realized for the first financial institution and for the second financial institution.

6. The method of claim 5, wherein the offset amount is a calculated based on a difference between:
    (1) the net difference, for the first financial institution, between losses avoided on the first plurality of properties and losses realized on the second plurality of properties; and
    (2) the net difference, for the second financial institution, between losses avoided on the second plurality of properties and losses realized on the first plurality of properties.

7. The method of claim 1, wherein the potential losses avoided are determined based on a difference between the offer amount of the short sale offer and the expected value.

8. The method of claim 7, wherein the expected value is adjusted by a present time value discount factor prior to determining the difference between the offer amount of the short sale offer and the expected value.

9. The method of claim 7, wherein the potential losses avoided are determined based additionally on a carrying cost associated with the property if the short sale offer is rejected.

10. The method of claim 1, wherein the potential losses realized are determined based additionally on a likelihood the property will fall into foreclosure.

11. The method of claim 1, wherein determining the expected property value comprises using an automated valuation model (AVM) to derive the expected property value.

12. The method of claim 11, wherein the AVM is a distressed property AVM.

13. The method of claim 12, wherein the distressed property AVM is based at least in part on REO property data, comparable sales data, lien data related to the property, and data related to physical damages on the property.

14. The method of claim 1, wherein determining the expected property value further comprises using a custom valuation model to derive the expected property value, the custom valuation model being customized based on criteria provided by the first or the second financial institution.

15. The method of claim 1, wherein identifying the first plurality of properties identifies properties based at least partly on one or more of: a geographic preference, a maximum bound on a number of properties, a maximum bound on an aggregate value of properties, a minimum bound on a number of properties, a minimum bound on an aggregate value of properties.

16. The method of claim 15, wherein one or more of the geographic preference, the maximum bound on a number of properties, the maximum bound on an aggregate value of properties, the minimum bound on a number of properties, the minimum bound on an aggregate value of properties is provided by the first financial institution or the second financial institution.

17. The method of claim 15, wherein one or more of the geographic preference, the maximum bound on a number of properties, the maximum bound on an aggregate value of properties, the minimum bound on a number of properties, the minimum bound on an aggregate value of properties is mutually agreed upon by the first financial institution and the second financial institution.

18. A system for determining for assessing the value of a set of real properties, the system comprising:
a computerized system comprising one or more computing devices which comprise one or more hardware processors and memory, said computing devices configured to implement at least:
  a data storage for receiving data related to a set of properties, wherein each property is associated with two or more mortgages and a short sale offer; and
  a bundle assessment system configured to use the data in said data storage to:
    for each property in the set of properties,
      determine an expected property value if the property falls into foreclosure;
      determine potential losses avoided by a holder of a primary mortgage associated with the property if the short sale offer is accepted, the determining based at least partly on the determined expected property value and an offer amount of an associated short sale offer; and
      determine potential losses realized by a holder of a junior mortgage associated with the property if the short sale offer is accepted, the determining based at least partly on the determined expected property value and the offer amount of the associated short sale offer;
    identify a first plurality of properties, within the set of properties, in which a first financial institution is a holder of primary mortgages associated with the first plurality of properties and a second financial institution is a holder of junior mortgages associated with the first plurality of properties;
    identify a second plurality of properties, within the set of properties, in which the first financial institution is a holder of junior mortgages associated with the second plurality of properties and the second financial institution is a holder of primary mortgages associated with the second plurality of properties; and
    determine, based on the determined potential losses avoided and realized for each property in the first and second pluralities of properties, aggregate amounts of losses avoided and losses realized for the mortgage holders for the first and second pluralities of properties, to facilitate an exchange of mutual release of junior mortgages by the first and second financial institutions to facilitate short sales of the first and second pluralities of properties.

19. The system of claim 18, wherein the bundle assessment system is further configured to:
for one or more property in the set of properties,
  determine an availability of a deficiency judgment for the property based at least in part on foreclosure laws of the state in which the property is located; and
  in response to determining that a deficiency judgment is not available, determine a recommended amount of a promissory note from a borrower of a junior mortgage associated with the property to the junior mortgage holder.

20. The system of claim 19, wherein the recommended amount of the promissory note is further determined based on a credit status of the borrower.

21. The system of claim 19, wherein the recommended amount of the promissory note is further determined based on a delinquency status of the junior mortgage.

22. The system of claim 18, wherein the bundle assessment system is configured to determine an offset amount to account for differences between the aggregate losses avoided and losses realized for the first financial institution and for the second financial institution.

23. The system of claim 22, wherein the offset amount is a calculated based on a difference between:
(1) the net difference, for the first financial institution, between losses avoided on the first plurality of properties and losses realized on the second plurality of properties; and
(2) the net difference, for the second financial institution, between losses avoided on the second plurality of properties and losses realized on the first plurality of properties.

24. The system of claim 18, wherein the potential losses avoided are determined based on a difference between the offer amount of the short sale offer and the expected value.

25. The system of claim 24, wherein the bundle assessment system is further configured to adjust the expected value by a present time value discount factor prior to determining the difference between the offer amount of the short sale offer and the expected value.

26. The system of claim 24, wherein the potential losses avoided are determined based additionally on a carrying cost associated with the property if the short sale offer is rejected.

27. The system of claim 18, wherein the potential losses realized are determined based additionally on a likelihood the property will fall into foreclosure.

28. The system of claim 18, wherein the bundle assessment system is configured to determine the expected property value using an automated valuation model (AVM).

29. The system of claim 28, wherein the AVM is a distressed property AVM.

30. The system of claim 29, wherein the distressed property AVM is based at least in part on REO property data, comparable sales data, lien data related to the property, and data related to physical damages on the property.

31. The system of claim 18, wherein the bundle assessment system is configured to determine the expected property value using a custom valuation model, the custom valuation model being customized based on criteria provided by the first or the second financial institution.

32. The system of claim 18, wherein the bundle assessment system is configured to identify the first plurality of properties based at least partly on one or more of: a geographic preference, a maximum bound on a number of properties, a maximum bound on an aggregate value of properties, a minimum bound on a number of properties, a minimum bound on an aggregate value of properties.

33. The system of claim 32, wherein one or more of the geographic preference, the maximum bound on a number of properties, the maximum bound on an aggregate value of properties, the minimum bound on a number of properties, the minimum bound on an aggregate value of properties is provided by the first financial institution or the second financial institution.

34. The system of claim 32, wherein one or more of the geographic preference, the maximum bound on a number of properties, the maximum bound on an aggregate value of properties, the minimum bound on a number of properties, the minimum bound on an aggregate value of properties is mutually agreed upon by the first financial institution and the second financial institution.

\* \* \* \* \*